(12) United States Patent
Lu et al.

(10) Patent No.: US 8,408,359 B2
(45) Date of Patent: Apr. 2, 2013

(54) ACOUSTIC ATTENUATION METHOD BASED ON ACOUSTIC RAY DEFLECTION THEORY AND A MUFFLER

(75) Inventors: Yadong Lu, Haidian District of Beijing (CN); Dong Liu, Haidian District of Beijing (CN); Qiang Wang, Haidian District of Beijing (CN)

(73) Assignee: Institute of Acoustics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 13/203,699

(22) PCT Filed: Feb. 26, 2010

(86) PCT No.: PCT/CN2010/000242
§ 371 (c)(1),
(2), (4) Date: Sep. 20, 2011

(87) PCT Pub. No.: WO2010/097014
PCT Pub. Date: Sep. 2, 2010

(65) Prior Publication Data
US 2012/0055735 A1   Mar. 8, 2012

(30) Foreign Application Priority Data

Feb. 27, 2009   (CN) .......................... 2009 1 0119947

(51) Int. Cl.
*F01N 1/10*   (2006.01)
(52) U.S. Cl. .......................... 181/252; 181/222; 181/256
(58) Field of Classification Search .................. 181/222, 181/252, 256, 259
See application file for complete search history.

(56) References Cited

U.S. PATENT DOCUMENTS 4,426,844 A * 1/1984 Nakano .......................... 60/295
(Continued)

FOREIGN PATENT DOCUMENTS

| CN | 2195622 Y | 4/1995 |
|----|-----------|--------|
| CN | 101313130 A | 11/2008 |
| JP | 4-19320 A | 1/1992 |
| JP | 2000-161042 A | 6/2000 |
| JP | 2006-104975 A | 4/2006 |

(Continued)

OTHER PUBLICATIONS

Zhu et al., "Numerical Analysis of Perforated Tube Muffler," Journal of Noise and Vibration Control, Jun. 2008, 3 pages.

(Continued)

*Primary Examiner* — Forrest M Phillips
(74) *Attorney, Agent, or Firm* — Davis Wright Tremaine LLP

(57) ABSTRACT

The present invention provides an acoustic attenuation based on sound ray deflection theory and a muffler. The method of the present invention provides a temperature gradient between the interior and the exterior of the chamber of the muffler through the low temperature refrigeration system, in which the temperature inside the pipe wall is higher than that outside the pipe wall. The said temperature gradient may deflect the acoustic ray towards the low temperature direction, so as to capture and reduce the noise. The muffler of the present invention comprises a muffler housing laid with a sound absorbing structure (4) on its internal surface, is characterized by the low temperature refrigerating system (2) which is fixed in the position corresponding to the sound absorbing structure (4) on the external surface of the muffler housing (1), covers at least 5% of the area of the external surface of muffler housing (1), and is used to realize quantitative control of the temperature gradient together with a temperature control system (3). The muffler of the present invention effectively improves the noise-absorbing effect of the prior muffler.

16 Claims, 9 Drawing Sheets

U.S. PATENT DOCUMENTS

| | | | |
|---|---|---|---|
| 5,109,950 A * | 5/1992 | Lescher | 181/256 |
| 5,936,210 A * | 8/1999 | Borneby et al. | 181/264 |
| 5,992,560 A | 11/1999 | Matsuoka et al. | |
| 2004/0163887 A1* | 8/2004 | Ziehl | 181/256 |
| 2008/0185133 A1* | 8/2008 | Mabuchi et al. | 165/168 |
| 2010/0132347 A1* | 6/2010 | Ikeda et al. | 60/320 |
| 2011/0005856 A1* | 1/2011 | Larson | 181/211 |
| 2012/0024507 A1* | 2/2012 | Paze | 165/138 |

FOREIGN PATENT DOCUMENTS

KR  2009119557  * 11/2009

OTHER PUBLICATIONS

Wang et al., "Testing and Analysis on the Static Performance of Motor Muffler," Journal of Noise and Vibration Control, 2007, 4th issue, pp. 47-49.

* cited by examiner

ACOUSTIC ATTENUATION METHOD BASED ON ACOUSTIC RAY DEFLECTION THEORY AND A MUFFLER

CROSS-REFERENCE TO RELATED APPLICATIONS

The present application is a U.S. National Stage entry under 35 U.S.C. §371 of International Application No. PCT/CN2010/000242, filed Feb. 26, 2010, which in turn claims priority to Chinese Application No. 200910119947.3 filed Feb. 27, 2009, each of which is incorporated herein by reference in its entirety.

TECHNOLOGY FIELD

The present invention involves a muffler, especially involves an acoustic attenuation method based on acoustic ray deflection theory and a muffler.

BACKGROUND OF THE INVENTION

In recent decades, the air transport brings great convenience in travel, but simultaneously also poses a serious noise pollution around the airport. According to the investigation, the airplane noise seriously occurs upon taking off or landing, especially upon taking off. The airport is usually near to the city, more over the flight course is crossing the urban sky partially. Therefore the aircraft noise has become an important component of the urban noise, which influenced the people's normal life seriously, and it's urgent and imminent problem how to reduce the airplane flight noise maximally, especially when taking off or landing.

The aviation noise mainly results from the jet and fan of the aircraft engine. Over the years, researchers have been committing to find out an acoustic attenuation for reducing jet noise and fan noise with a good sound absorption effect over a wider range of frequency, and at present, generally the following methods and design criteria are adopted:
1. Designing the engines and nozzle with high bypass ratio to reduce jet noise;
2. Adjusting the design and speed of the fan rotor/stator blade to reduce fan noise; and
3. Applying the acoustic lining to the internal surface of the pipeline to reduce radiated engine noise.

Although laying the acoustic lining in pipe surface of the engine has achieved a good effect in the aspect of reducing noise, it still can't meet the present real requirement of the aircraft noise control, the environmental noise control around airports and the noise airworthiness. It is reported that Airbus is investing a lot of money to participate in the aircraft noise research project focusing to overcome the airplane noise reduction technology initiated by the nine European states, with a target to reduce the noise of airplane produced by it in 6 decibels on the basis of the present noise within 8 years. In fact, the mean noise reduction value each 10 years is less than 8 dB with respect to the mean noise reduction amplitude of the aircraft noise.

Application of the prior methods and means is unable to achieve a substantial noise reduction of aircraft engines, because the middle- or low-frequency noise usually can't be effectively controlled in the environment of the high acoustic intensity, resulting in having to substantially increase the depth of the air cavity of the sound-absorbing structure for enhancing its absorption, which usually can't be completed in the actual noise reduction. Therefore, it is necessary to further develop of the capability of absorbing sound for the prior the lining of the surface of the prior aerial engine, for the basic structure does not change the existing muffler case to explore further the method and measures for improving the capability of absorbing the sound on the surface of the prior aircraft engine endeavoring not to change the structure of the prior muffler.

Hereafter, we obtain the present invention in the teaching of the impact on the acoustic transmission in the atmosphere by the nature temperature gradient. During the day, we may feel the environment around us more noisy than at night, which is resulted from the great impact of the temperature gradient on the transmission of the acoustic wave by the way that the sonic speed is closely related with the temperature, and the temperature gradient causes the sonic speed to change above the ground. During the day, specially on a sunny day, in the afternoon with sunlight, a significant negative temperature gradient from the ground results in the surface temperature is higher than the air temperature, the speed of the sonic speed on the ground is faster, and the sonic speed on the sky is slower, so that the sound may transmit along the path taking the least time according to the Fermat's principle. Thus, during the day, the acoustic ray may bend to and refract toward "the cold end—Sky", and the acoustic ray refracted upward almost doesn't contact the earth which can not play the role as a "sound-absorbing structure", notwithstanding the simultaneous emergence of "the acoustical shadow zone". Therefore, during the day we will feel the environment around us more noisy. In contrast, at night, the positive temperature gradient above the ground results in the surface temperature is lower than the atmospheric temperature, the sonic speed on the ground is slower, the sonic speed on the sky is faster, so that the acoustic ray will bend to and refracted toward "the cold end", the earth, according to the Fermat's principle, and only part of the acoustic wave is reflected back to the atmosphere, but most of the energy is transmitted through the pores of the soil, absorbed and attenuated by the earth for the incidence of the acoustic wave of the air to the porous earth. It is under the effect of the temperature gradient using the earth as code end at night that the earth fully functioned as "sound-absorbing structure", resulting in feeling the silence of environment around us at night.

In addition, in the case of snowing, we can feel the quietness resulting from the earth as "sound-absorbing structure covered with the snow" with the effect of temperature gradient using the earth as cold end. The FIGS. 2 and 3 show the deflection of the acoustic ray in the case that temperature decreases with the height during the day and the temperatures increases with the height.

Based on the example of the impact of the temperature gradient in the nature has on the atmospheric sound transmittance, we can come to the conclusion that the acoustic ray will deflect toward the cold end in the effect of the temperature gradient, making it possible to capture and attenuate the noise using the "cold trap", and further to develop a muffler having a low temperature refrigeration system based on the temperature gradient and the acoustic ray deflection by the above method, so as to further improve the ability of the conventional muffler to attenuate the noise, for the present invention.

However, by far, the research in the design of the muffler only considered the influence of temperature, without taking into account the impact of the acoustic ray reflection the use of temperature gradient exist within the muffler leading to voice deflection for improving the muffler volume effects, such as literature: "Perforated pipe muffler Numerical Analysis" Helie Zhu, Zhengshi Liu, Journal of noise and vibration control in June 2008 (3); "Engine Muffler Static Performance Testing and Analysis," Xiaojun Wang, Zhiyuan Li, Haozheng Wei, Journal of noise and vibration control, 2007 4th issue.

THE SUMMARY

One object of the present invention is to overcome the limitation of the conventional sound attenuation method and the design criterion to the improving space on the ability of absorbing the sound, and to provide an acoustic attenuation method based on acoustic ray deflection theory and a muffler.

To realize the above-mentioned object, the present invention provides an acoustic attenuation method based on sound ray deflection theory, comprising of, providing a temperature gradient, in which the temperature on the outer surface of the wall of the chamber is lower than that of the interior of the chamber, between the interior and the exterior of the chamber through a low temperature refrigeration system fixed on the external surface of the pipe wall of a muffler; and deflecting the acoustic ray inside the muffler pipeline toward the external surface with the lower temperature resulting from the said temperature gradient according to Fermat principle, in allowance of more acoustic rays transmitting into an absorption sound structure inner-lined to the muffler in the form of oblique incidence, resulting in the increase of the incidence angle of the acoustic wave in glancing incidence, the increase of the sound-absorption coefficient for the said absorption sound structure, more effectively absorbing the noise inside the muffler pipeline, the reduction the amplitude in the stimulated acoustics normal vibration pattern within the muffler pipeline, the increase of the acoustic attenuation capability of the muffler, and the decrease of the radiated noise.

The present invention also provides a muffler based on acoustic ray deflection theory, including a muffler housing 1, laid with a sound absorption structure 4 on its inner surface, wherein, the external surface of the said housing 1 is provided with a low temperature refrigeration system 2, covering at least 5% of the area of the external surface of the muffler housing 1, in the position corresponding to the sound absorption structure 4.

As one improvement of the present invention, the said low temperature refrigeration system 2 is connected with a temperature control installment 3 to realize a quantitative control of the temperature gradient. The said quantitative control of the temperature gradient ranges from 1° C. to 2000° C., higher than the temperature inside the pipeline of the muffler housing 1 compared with the temperature on the external surface of the muffler housing 1.

The said sound absorption structure 4 described in above technical solution may be selected from the porous sound-absorbing material, a chip resonance sound-absorbing structure, a film resonance sound-absorbing structure, a perforated panel sound-absorbing structure, a micro-perforated panel sound-absorbing structure, the micro slit sound-absorbing structure, a tube bundle perforated panel resonance sound-absorbing structure or a tube bundle perforated panel composite resonance sound-absorbing structure, and is 1 to 1000 mm in thickness.

The low temperature refrigeration system 2 described in above technical solution may be selected from a compressor refrigeration system, a semiconductor refrigeration system, a liquid nitrogen refrigeration system, a dry ice refrigeration system, an acoustic refrigeration system, a chemical refrigeration system, a magnetism refrigeration system, an adsorption refrigeration system, a pulse tube refrigeration system or a solar energy refrigeration system, and also may realize refrigeration by providing a cold end, the external surface of the muffler housing 1, by transporting the cooling gas or the cooling liquid with the temperature lower than that of the interior of the pipeline, or coating an ice layer on the external surface of the muffler housing 1.

Preferably, the said low-temperature refrigeration system of the muffler according to the present invention is the compressor refrigeration system into a connection with the temperature control installment 3 comprising of an expansion valve 6 and a capillary temperature bulb 7, which includes a compressor 10, a condenser 11, an evaporator 12 winding around the external surface of the muffler pipeline by its pipeline, and a receiver-dryer 5;

the semiconductor refrigeration system which includes a insulation potsherd 13, a metallic conductor 14, N-type and P-type semiconductors 15 and a direct-current power supply 16 in connection into the cold end 17 and the hot end 18 respectively, wherein the cold end 17 attaches to the external surface of the muffler housing 1, the temperature control installment (3) regulates the heat dispersion using a radiating fin, a fan and the cooling air or the water; and a semiconductor refrigeration chip is applied to the external surface of the muffler pipeline, so as to control the temperature of the external surface of the muffler housing 1 by regulating the heat dispersion of the hot end of the semiconductor refrigeration chip;

the liquid nitrogen refrigeration system which includes a liquid nitrogen Dewar's flask 19, a normal temperature nitrogen cylinder 39 and a pipeline chiller 20, to which the liquid nitrogen and the nitrogen in the normal temperature are fed and mixed, covering the external surface of the muffler housing 1, and electronically connecting with a flow meter of the temperature control device 3, configured to control the temperature of the external surface of the muffler housing 1 by controlling the flow rates of the liquid nitrogen and the nitrogen in the normal temperature;

the magnetism refrigeration system which includes magnetic refrigerant 27, a N-magnetic pole 25, S-magnetic pole 26, a radiator 28 and a pipeline chiller 20, wherein the said magnetic refrigerant 27 is isothermally magnetized in the high temperature area 23, emitting the heat which is dissipated through the radiator 28, and is adiabatically demagnetized in the low temperature area 24, absorbing the heat by the pipeline chiller 20 mounted in the low temperature area of the magnetic refrigerant 27, to form the cold end covering the external surface of the muffler housing 1; and the thermo acoustic refrigeration system which may be selected from a standing wave thermo acoustic refrigerator, a traveling wave thermo acoustic refrigerator, a stirling refrigerator or a pulse tube refrigerator which emits the heat in the high temperature heat exchanger 30 according to the thereto acoustic principle, and absorbs the heat in the low temperature heat exchanger 31 in connection with a pipeline chiller 20 covering the external surface of the muffler housing 1, respectively, in order to form the cold end, wherein the said standing wave thermo acoustic refrigerator includes an acoustic wave generator 29, a high temperature heat exchanger 30, a low temperature heat exchanger 31, a heat regenerator 32, a resonator cavity 33 and a pipeline chiller 20, the said traveling wave thermo acoustic refrigerator includes an acoustic wave generator 29, a high temperature heat exchanger 30, a low temperature heat exchanger 31, a heat regenerator 32, a traveling wave acoustic tube 34 and a pipeline chiller 20, the said Stirling refrigerator includes an acoustic wave generator 29, an acoustic wave absorber 35, a high temperature heat exchanger 30, the low temperature heat exchanger 31, heat regenerator 32 and a pipeline chiller 20, and the said pulse tube refrigerator includes an acoustic wave generator 29, a high temperature heat exchanger 30, a low temperature heat exchanger 31, a heat regenerator 32, a gas storage 36, a valve 37, a pulse tube 38 and a pipeline chiller 20; or the said low-temperature refrigeration system of the muffler according to the present invention may realize refrigerating by providing a cold end formed by flowing the cooled air or liquid with the temperature lower than that of the interior the pipeline through the said pipeline chiller 20 covering the outer surface of the muffler housing 1; or by coating an ice layer formed by virtue of the physical property of the ice and the dry ice which is put in the pipeline chiller 20 covering the external surface of the muffler housing 1.

According to the present invention, it is by installing the low temperature refrigeration system on the external surface of the conventional muffler pipeline to additionally provide a temperature gradient, the temperature inside the pipeline higher than that outside the pipeline, between the interior and the exterior of the muffler pipeline, resulting in deflecting the acoustic ray inside the pipeline toward the external surface of the pipeline installed with the low temperature refrigeration system on the surface, using the temperature gradient according to Fermat's Theorem, allowing more acoustic rays to transmit into the absorbing-sound structure which is fixed in the inner lining of the muffler in the form of oblique incidence rather than grazing incidence, so as to more fully and effectively perform the sound-absorption potential of the muffler, reduce the amplitude in the stimulated acoustics normal vibration pattern within the muffler, and provide a muffler based on acoustic ray deflection theory.

The muffler based on the acoustic ray deflection theory of the present invention may be the pipe muffler which is provided with a sound-absorbing structure with a certain thickness on the internal surface of the muffler housing, and a low temperature refrigeration system on the external surface of the muffler housing, wherein the said low temperature refrigeration system may be selected from the compressor refrigeration system, the semiconductor refrigeration system, the liquid nitrogen refrigeration system, the dry ice refrigeration system, the acoustic refrigeration system, the chemical refrigeration system, the magnetism refrigeration system, the adsorption refrigeration system, the solar energy refrigeration system and so on; and may also provide the cold end by transporting the gas or the cooling liquid with the temperature lower than that inside the pipeline with the refrigeration system already fixed in the surrounding environment, or even by coating the ice layer on the external surface of the muffler housing. Moreover, in the case of refrigerating by the compressor refrigeration system, the evaporator pipeline may wrap around the external surface of the muffler pipeline; in the case of refrigerating by the semiconductor refrigeration system, the semiconductor refrigeration chip may be attached to the external surface of the muffler pipeline; and in the case of refrigerating by the liquid nitrogen and dry ice, the liquid nitrogen and the dry ice may be infused to the heat exchanger, followed by covering the external surface of the muffler pipeline. Temperature control device is used to regulate the temperature of the low temperature refrigeration system so as to set the temperature gradient between the inside and outside of the muffler. The temperature inside the muffler pipeline is higher than that outside the muffler pipeline. It is the temperature gradient provided between the inside and outside of the muffler pipeline to deflect the acoustic ray toward the sound-absorbing structure on the internal surface of the muffler, resulting in effectively performing the capability of the sound-absorbing structure to absorb the sound, increasing the sound absorption quantity of the sound-absorbing structure, which causes the change of the sound-absorbing structure from the "less saturated" state to the "saturated or over-saturated" state. At the same time, as a result of the acoustic ray deflection, incidence angle of the sound wave in the glancing incidence increases, and the sound-absorption coefficient of the sound-absorbing structure is enhanced, eventually contributing to the increase of the sound absorption capability.

Therefore, the present invention proposes a method for capturing and reducing the noise utilizing "the cold trap", the muffler with the low temperature refrigeration based on the acoustic ray deflection depending on the temperature gradient. This novel muffler includes the pipeline muffler, the low temperature refrigeration system and the temperature control device, wherein the sound-absorbing structure is laid on the internal surface of the pipeline muffler, and the low temperature refrigeration system for decreasing the temperature of the back board of the sound-absorbing structure is installed on the external surface of the pipeline muffler, resulting in a temperature gradient from a relatively high temperature to a relatively low temperature within the sound-absorbing structure of the muffler which has the acoustic ray within the pipeline muffler curved and deflected permitting the oblique incidence of more acoustic wave to the sound-absorbing structure, so that the sound-absorbing structure is able to "catch" more noise through the cold end of the low temperature refrigeration system, rather than permit noise to flit across its surface, resulting in a full use of the sound-absorbing potential of the sound-absorbing structure, the improvement to the absorption capacity, the conversion of the sound-absorbing capacity of the muffler change from the "less saturated" to "saturated or over-saturated" state, the greatly improvement to the effect of absorbing the sound for the sound-absorbing structure, and the additional sound-absorbing capability to the original sound-absorbing capability the conventional muffler.

The muffler based on the acoustic ray deflection theory according to the present invention may be used for the design on the acoustic attenuation of the nacelle of the aviation turbofan engine, the sound-absorption of the duct of the helicopter turbo shaft engine and the convenient provision of the low temperature refrigeration system and the cold end with a pipe muffler. In case that the muffler based on the acoustic ray deflection with the low temperature refrigeration system is applied for the design of the nacelle for the aviation turbofan engine, the low temperature refrigeration system can be started up only when the plane is taking off and landing, and is turned off when cruising for the purpose of saving the energy sources, resulting in the significantly increase of the sound-absorbing capability of the nacelle of the aviation turbofan engine, with a hope to more effectively control the environmental noise around airports, and satisfy the requirement of the noise seaworthiness.

Compared with the conventional method, the present invention has the following advantages of the further enhancement to the acoustic attenuation capability of the conventional pipeline muffler based on the acoustic ray deflection theory, as well as the convenience of the installation resulted from the improvement to the conventional pipeline muffler by installing the low temperature refrigeration system on the external surface of conventional pipeline muffler, by adding a set of low temperature refrigeration system to the original muffler without the change to the overall structure of the muffler in substance, according to the present invention, resulting in the decrease of the difficulty and cost of the modification.

| | |
|---|---|
| 1 | Muffler housing |
| 2 | Low temperature refrigeration system |
| 2' | Ice layer in 100 mm thick |
| 2" | The semiconductor refrigeration system |
| 3 | Temperature control device |
| 4 | Sound-absorbing structure |
| 4' | Tube bundle perforation board composite resonance sound-absorption structure |
| 5 | Receiver-dryer |
| 6 | Expansion valve |
| 7 | Capillary temperature bulb |
| 8 | Low-pressure pipe |
| 9 | High-pressure pipe |
| 10 | Compressor |
| 11 | Condenser |
| 12 | Evaporator |
| 13 | Insulation potsherd |
| 14 | Metallic conductor |
| 15 | N-type and P-type semiconductor |
| 16 | Direct current power supply |
| 17 | Cold end |
| 18 | Hot end |
| 19 | Liquid nitrogen Dewar's flask |
| 20 | Pipeline chiller |
| 21 | Micro slit sound-absorption structure |
| 22 | Ice |
| 23 | High-temperature area |
| 24 | Low-temperature area |
| 25 | N- magnetic pole |
| 26 | S-magnetic pole |
| 27 | Magnetic refrigerant |
| 28 | Radiator |
| 29 | Acoustic wave generator |
| 30 | High-temperature heat exchanger |
| 31 | Low-temperature heat exchanger |
| 32 | Heat regenerator |
| 33 | Resonance cavity |
| 34 | Traveling wave acoustic tube |
| 35 | Acoustic wave absorber |
| 36 | Gas storage 37- Valve |
| 38 | Pulse tube |
| 39 | Nitrogen cylinder |

EMBODIMENT

Hereafter, the present invention will be described in details referring to the figures and examples.

Figure 1:
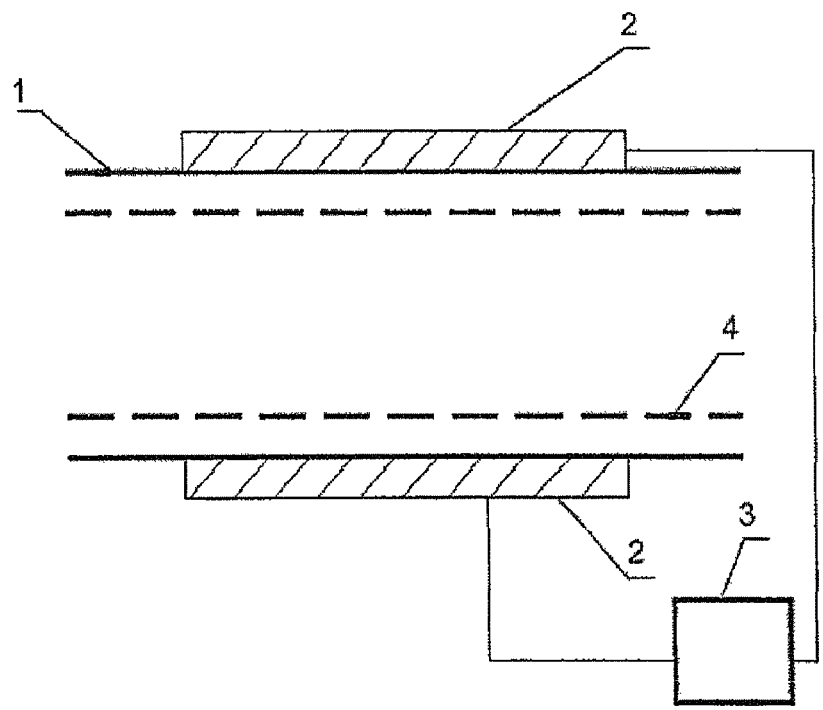
FIG. 1 schematically shows the muffler with the low temperature refrigeration system of the present invention.
Figure 2:
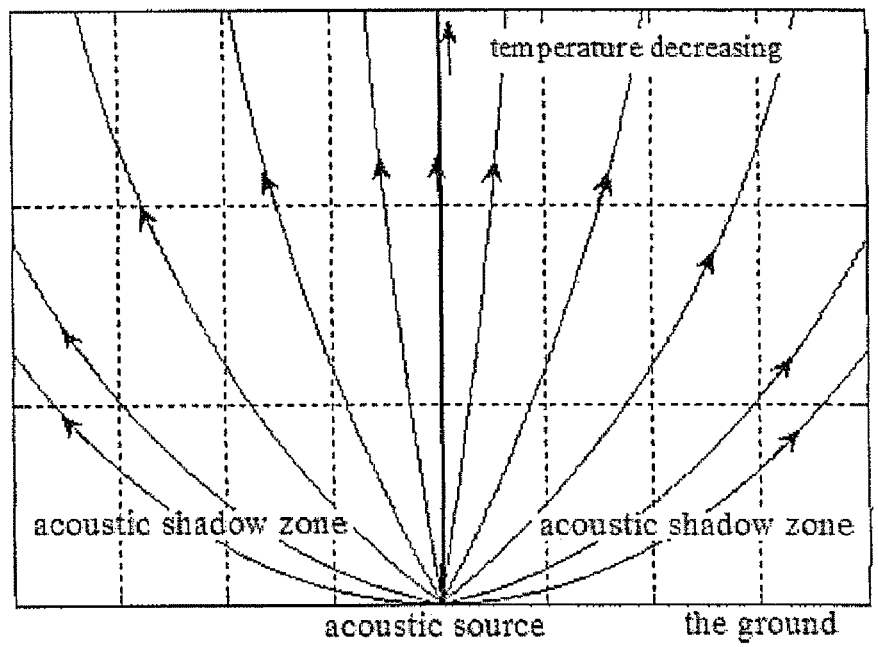
FIG. 2 shows the schematic graph of the sound ray deflection in case of the temperature decreasing with height during the day.
Figure 3:
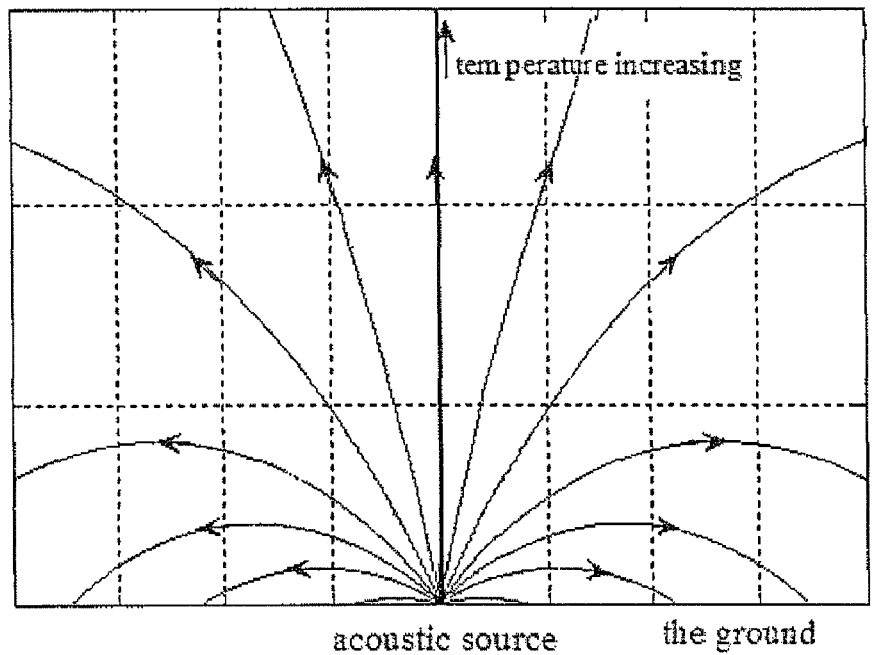
FIG. 3 shows the schematic graph of the sound ray deflection in case of the temperature increasing with height at night.

As shown in FIG. 1, The muffler based on sound ray deflection theory according to the present invention includes the muffler housing 1, the low temperature refrigeration system 2 covering at least 5% of the area of the external surface of the air current pipeline and the temperature control device 3, wherein the internal surface of the muffler housing 1 is laid with the sound-absorbing structure 4 with the thickness of 1 to 100 mm, and the low temperature refrigeration system 2 is installed on the external surface of muffler housing 1. The said low temperature refrigeration system 2 may be selected from the compressor refrigeration system, the semiconductor refrigeration system, the liquid nitrogen refrigeration system, the dry ice refrigeration system, the sound refrigeration system, the chemical refrigeration system, the magnetism refrigeration system, the adsorption refrigeration system, and the solar energy refrigeration system and so on; and may also refrigerated by delivering the gas with the temperature lower than that inside the pipeline by the refrigeration system prior fixed in the surrounding environment, or even by providing the cold end formed by the coating the ice layer on the external surface of the muffler housing. The said low temperature refrigeration system 2 of the muffler according to the present invention is installed on the muffler, and provides a large temperature gradient of 1 to 2000° C. in comparison with the higher temperature within the airflow pipeline, so that, the acoustic ray transmits along the route taking the least time and with the fastest speed according to Fermat's theorem, and deflects towards the cold end, the sound-absorbing structure on the internal surface of the airflow pipeline, reducing the portion of the acoustic waves within the muffler pipeline which flits without the contact with the sound-absorbing structure, allowing the oblique incidence of more acoustic wave to the sound-absorbing structure, enabling the sound absorption potential of the sound-absorbing structure to be more effectively and fully played, enhancing the effective absorption of the noise within the pipeline, reducing the amplitude of the stimulated acoustics normal vibration pattern in the pipeline, increasing the acoustic attenuation of the muffler, and reducing the radiated noise. The temperature within the airflow pipeline may be the normal temperature or the high temperature, and the higher the temperature is, the greater the relative temperature gradient is, and the more acoustic ray will bend and deflect, so it is more conducive to fully perform the sound-absorption potential of the convention sound-absorbing structure.

Example 1

Figure 4:
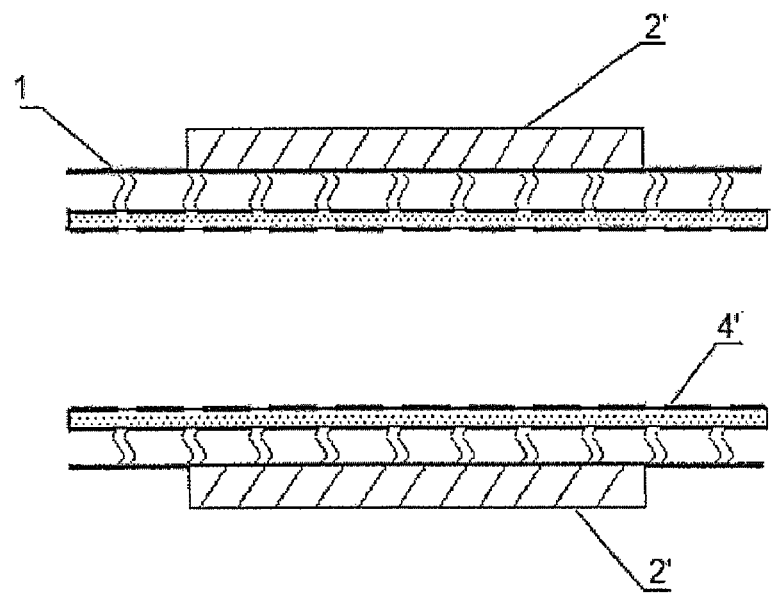
FIG. 4 schematically shows the muffler exteriorly coated with ice layer in 100 mm thick and using the tube bundle perforation board composite resonance sound absorption structure.
Figure 5:
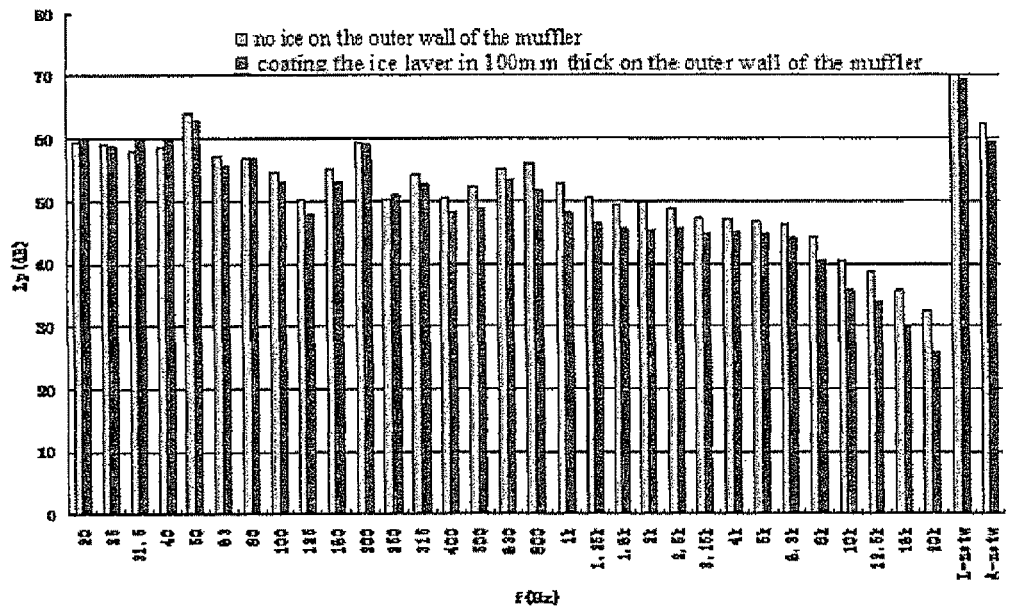
FIG. 5 shows the diagram of the measurement on the insertion loss comparing the mufflers having an exterior coat of ice in 100 mm thick ice and uncoated.

As shown in the FIG. 4, the muffler with the low temperature refrigeration system based on the acoustic ray deflection theory is composed of the muffler housing 1, the sound-absorbing structure 4 and the low temperature refrigeration system 2. In this implementation, the sound-absorbing structure 4 is the tube bundle micro slit perforation board resonance sound absorption device coated with a layer of sound-absorbing cotton on the surface. The external surface of the muffler housing 1 is coated with the ice layer 2' in 100 mm thick as the low temperature refrigeration system 2, and the internal surface of the muffler housing 1 is laid with the said tube perforation board composite resonance sound-absorption structure 4'. The housing of the muffler on the outlets of the axial flow fan is coated with the ice layer 2' in 100 mm thick, and the insertion loss resulted from coating is measured with the experimental parameters as follows:

Experimental parameters: the ambient temperature in 12° C., the air quantity of the fan in 8000 m$^3$/h, the wind pressure in 200 Pa, the wind speed in 12.7 m/s, the dimensions of the inner channel of the muffler in 0.7 m×0.25 m, the length in 1 m. The muffler housing 1 is equipped with the tube bundle perforation board composite resonance sound-absorption structure with the sound-absorbing cotton in 100 mm thick, the volume weight in 32 Kg/m$^3$, the bundle length in 10 mm, the bundle diameter in 1.6 mm, the perforation rate of 3.6%, the aperture length in 3.6 mm, the aperture width in 0.04 mm, the cavity depth in 100 mm, and the measurements are shown in FIG. 5 and Table 1.

TABLE 1

The measurements on the insertion loss caused by coating the ice layer with the thickness of 100 mm on the external surface of the muffler.

| Frequency (Hz) | The noise (dB) of the outlet of the muffler without the ice layer | The noise (dB) of the outlet of the muffler exteriorly coated with the ice layer in 100 mm thick | Insertion loss (dB) caused by coating the ice layer |
|---|---|---|---|
| 20 | 59.4 | 59.9 | −0.5 |
| 25 | 59.1 | 58.8 | 0.3 |
| 31.5 | 58.1 | 59.9 | −1.8 |
| 40 | 58.7 | 59.9 | −1.2 |
| 50 | 64 | 63 | 1 |
| 63 | 57.2 | 55.8 | 1.4 |
| 80 | 56.7 | 56.8 | −0.1 |
| 100 | 54.6 | 53.2 | 1.4 |
| 125 | 50.2 | 48 | 2.2 |
| 160 | 55 | 53.2 | 1.8 |
| 200 | 59.6 | 59.1 | 0.5 |
| 250 | 50.3 | 51 | −0.7 |
| 315 | 54.3 | 52.8 | 1.5 |
| 400 | 50.4 | 48.3 | 2.1 |
| 500 | 52.4 | 48.7 | 3.7 |
| 630 | 55.2 | 53.3 | 1.9 |
| 800 | 56.1 | 51.7 | 4.4 |
| 1k | 52.8 | 48.1 | 4.7 |
| 1.25k | 50.6 | 46.4 | 4.2 |
| 1.6k | 49.3 | 45.5 | 3.8 |
| 2k | 50 | 45.4 | 4.6 |
| 2.5k | 48.8 | 45.7 | 3.1 |
| 3.15k | 47.2 | 44.8 | 2.4 |
| 4k | 47.1 | 44.9 | 2.2 |
| 5k | 46.7 | 44.7 | 2 |
| 6.3k | 46.1 | 44.1 | 2 |
| 8k | 44.1 | 40.4 | 3.7 |
| 10k | 40.4 | 35.7 | 4.7 |
| 12.5k | 38.6 | 33.8 | 4.8 |
| 16k | 35.7 | 30.1 | 5.6 |
| 20k | 32.5 | 25.8 | 6.7 |
| L linear | 70.2 | 69.5 | 0.7 |
| A soundlevel | 62.5 | 59.4 | 3.1 |

As shown in FIG. 5 and Table 1, the temperature gradient generated by the cold end provides the insertion loss resulting from bending and deflection of the acoustic ray is up to 1.5-6.7 dB within the frequency range of 315 Hz-20 KHz, 0.5-2.2 dB within the frequency range of 100 Hz-200 Hz, and is 3.1 dBA when coating the ice layer in 100 mm thick.

Figure 6:
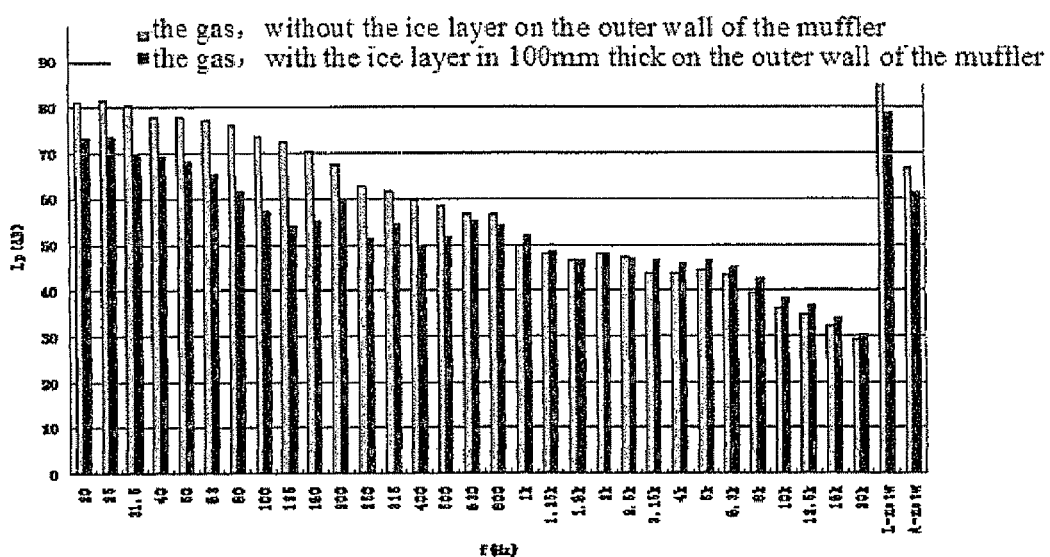
FIG. 6 shows the diagram of the measurement on the insertion loss comparing the mufflers fed with the gas in high temperature from the intakes of the axial-flow fan, and having an exterior coat of ice layer in 100 mm thick ice and uncoated.

In addition, in the case that the temperature of the gas within the muffler, generated in the intake of the axial flow fan, reaches 65° C., the ice layer in 100 mm thick is coated on the external surface of the muffler, and the insertion loss caused by coating the ice layer is measured with the ambient temperature 12° C., and the measurements are shown in FIG. 6 and Table 2.

TABLE 2

The measurements on the insertion loss caused by coating the ice layer in 100 mm thick on the external surface of the muffler

| Frequency (Hz) | The noise (dB) of the muffler outlet in the case of generating the gas without the ice layer on the external surface of the muffler | The noise (dB) of the muffler outlet in the case of generating the gas and coating the ice layer on the external surface of the muffler | insertion loss (dB) caused by coating the ice layer |
|---|---|---|---|
| 20 | 81.3 | 73.2 | 8.1 |
| 25 | 81.7 | 73.6 | 8.1 |
| 31.5 | 80.4 | 69.5 | 10.9 |
| 40 | 78 | 69.4 | 8.6 |
| 50 | 77.9 | 68.2 | 9.7 |
| 63 | 77.3 | 65.5 | 11.8 |
| 80 | 76.2 | 61.8 | 14.4 |
| 100 | 73.8 | 57.3 | 16.5 |
| 125 | 72.6 | 54.3 | 18.3 |
| 160 | 70.4 | 55.3 | 15.1 |

TABLE 2-continued

The measurements on the insertion loss caused
by coating the ice layer in 100 mm
thick on the external surface of the muffler

| Frequency (Hz) | The noise (dB) of the muffler outlet in the case of generating the gas without the ice layer on the external surface of the muffler | The noise (dB) of the muffler outlet in the case of generating the gas and coating the ice layer on the external surface of the muffler | insertion loss (dB) caused by coating the ice layer |
|---|---|---|---|
| 200 | 67.6 | 59.8 | 7.8 |
| 250 | 62.7 | 51.2 | 11.5 |
| 315 | 61.6 | 54.5 | 7.1 |
| 400 | 59.5 | 49.7 | 9.8 |
| 500 | 58.4 | 51.7 | 6.7 |
| 630 | 56.7 | 55.1 | 1.6 |
| 800 | 56.6 | 54.2 | 2.4 |
| 1k | 50 | 51.8 | −1.8 |
| 1.25k | 48 | 48.4 | −0.4 |
| 1.6k | 46.5 | 46.7 | −0.2 |
| 2k | 48 | 47.8 | 0.2 |
| 2.5k | 47.4 | 47 | 0.4 |
| 3.15k | 43.8 | 46.4 | −2.6 |
| 4k | 43.9 | 45.9 | −2 |
| 5k | 44.6 | 46.5 | −1.9 |
| 6.3k | 43.2 | 45.1 | −1.9 |
| 8k | 39.6 | 42.6 | −3 |
| 10k | 36.2 | 38.3 | −2.1 |
| 12.5k | 34.7 | 37 | −2.3 |
| 16k | 32.2 | 34.1 | −3.9 |
| 20k | 29.4 | 30.5 | −1.1 |
| L linear | 88.4 | 78.8 | 9.6 |
| A sound level | 66.6 | 61.4 | 5.2 |

As shown in FIG. 6 and Table 2, in the case of generating the gas in the inlet of the axial flow fans, the insertion loss caused by the bending and deflection of the acoustic ray which is resulted from the temperature gradient generated by the cold end, the ice layer in 100 mm thick, is up to 7.1-18.3 dB within the frequency range of 20 Hz-400 Hz, and 2.4-6.7 dB within the frequency range of 500 Hz-800 Hz, and is added by −2.4 to 0.4 dB above 1 KHz frequency. It can be seen that the insertion loss resulted from coating the ice layer in 100 mm thick is 5.2 dBA in the case of generating smoke in the intake of the axial flow fans. Accordingly, more acoustic ray bends and deflects toward sound-absorbing structure in the internal surface of the muffler the due to the increase of the temperature gradient between the center and the external surface of the muffler, which further develops the sound-absorbing potential of the muffler and enhances the acoustic attenuation capability.

Although the temperature gradient, 0-12° C. and 0-65° C., formed by coating the ice layer in 100 mm thick on the cold end is not great, the additional acoustic attenuation capacity resulted from coating the ice layer has reached 3.1-5.2 dBA. It can be theoretically concluded that the greater the temperature gradient, the acoustic ray is bent and deflected in the higher degree, the more acoustic ray is transmitted to the sound-absorbing structure of the muffler in the oblique incidence, and it is more helpful to perform the acoustic potential of absorbing the sound for the conventional muffler.

The muffler of the present invention includes the pipe muffler, the low temperature refrigeration system and the temperature control devices, wherein the internal surface of the pipe muffler is laid with the sound-absorbing structure, and the external surface of the pipe muffler is equipped with the low temperature refrigeration system reducing the temperature of the backboard of the sound-absorbing structure resulting in producing a temperature gradient from a relatively high temperature area to a relatively low temperature area within the sound-absorbing structure of the muffler, which bends and deflect the acoustic ray within the pipeline muffler allowing more acoustic wave to transmit into the sound-absorbing structure in an oblique incidence. Therefore, the sound-absorbing structure is able to "catch" more noise through the cold end of the low temperature refrigeration system, rather than flit the noise across its surface, which can make a full use of the sound-absorption potential of the sound-absorbing structure, have its sound-absorption capacity fully played and improve the performance of the sound-absorption, resulting in the transition of the sound-absorbing capacity of the muffler from the "less saturated" to "saturated or over-saturated" state, and a great improvement on the sound-absorption effect of the sound-absorbing structure, and an addition to the original acoustic attenuation capability of the muffler. The muffler of the present invention produces the additional acoustic attenuation capability. Furthermore, if the technology of the present invention is applied for the design of the nacelle of the aircraft engine with a temperature gradient which may reach thousands of centigrade temperature, not only 3 to 5 dB in the noise reduction will be obtained, and the noise reduction technology of the aircraft engine will be developed in a more advanced level.

Example 2

Figure 7:
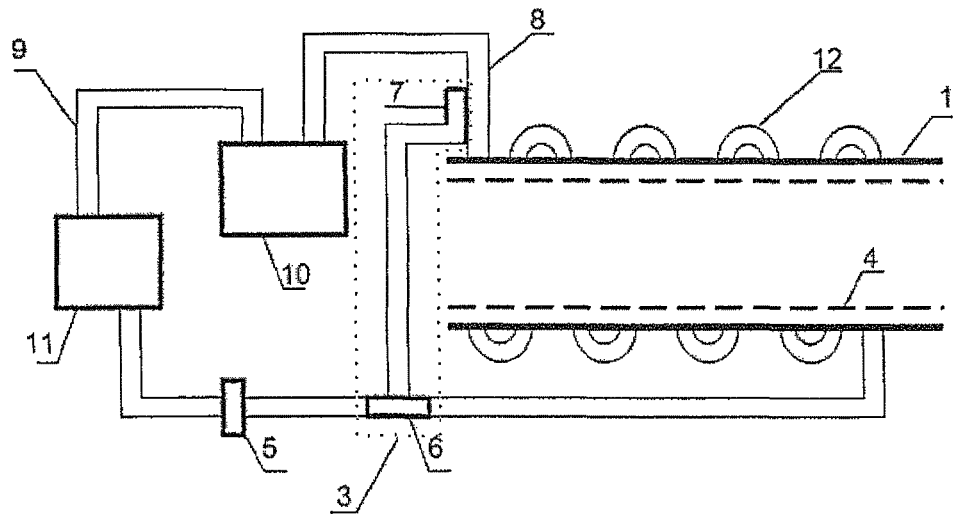
FIG. 7 schematically shows the muffler with the compressor as the refrigeration system according to an example of the present invention.

Referring to the FIG. 7, the muffler with the low temperature refrigeration system based on the acoustic ray deflection theory according to the example is composed of the muffler housing 1, the low temperature refrigeration system 2, the temperature control device 3 for realizing the quantitative control of the temperature gradient together with the low temperature refrigeration system 2, and the sound-absorbing structure 4, wherein the external surface of the muffler housing 1 is equipped with the low-temperature refrigeration system 2 using the compressor refrigeration system comprising the compressor 10, the condenser 11, the evaporator 12, the low-pressure pipe 8, the high pressure pipe 9 and the receiver-dryer 5. The said temperature control device 3 is the conventional temperature control device in the art, which consists of the expansion valve 6 and capillary temperature bulb 7. The said evaporator 12 is wrapped around the outer surface of the muffler pipeline to absorb heat. The sound-absorbing structure 4 is laid on inner surface of muffler housing 1, and may be selected from be the porous sound-absorbing material, the shell resonance sound-absorption structure, the film resonance sound-absorption structure, the perforation board sound-absorption structure, the micro-perforated board sound-absorption structure, the micro slit sound-absorption structure, or be tube bundle perforation board resonance sound-absorption structure and the composite resonance sound-absorption structure thereof which are disclosed by the CN application with the CN Patent No. ZL00100641.X filed by the inventors of the present invention.

The temperature control device of the low temperature refrigeration system is used for ensuring the temperature gradient ranging from 1° C. to 2000° C. between the internal surface and the external surface of the muffler pipeline, and that the temperature inside the pipeline is higher than the temperature of the cold end, the external surface of the pipeline, and should cover at least 5% of the area of the external surface of the muffler housing.

Example 3

Figure 8:
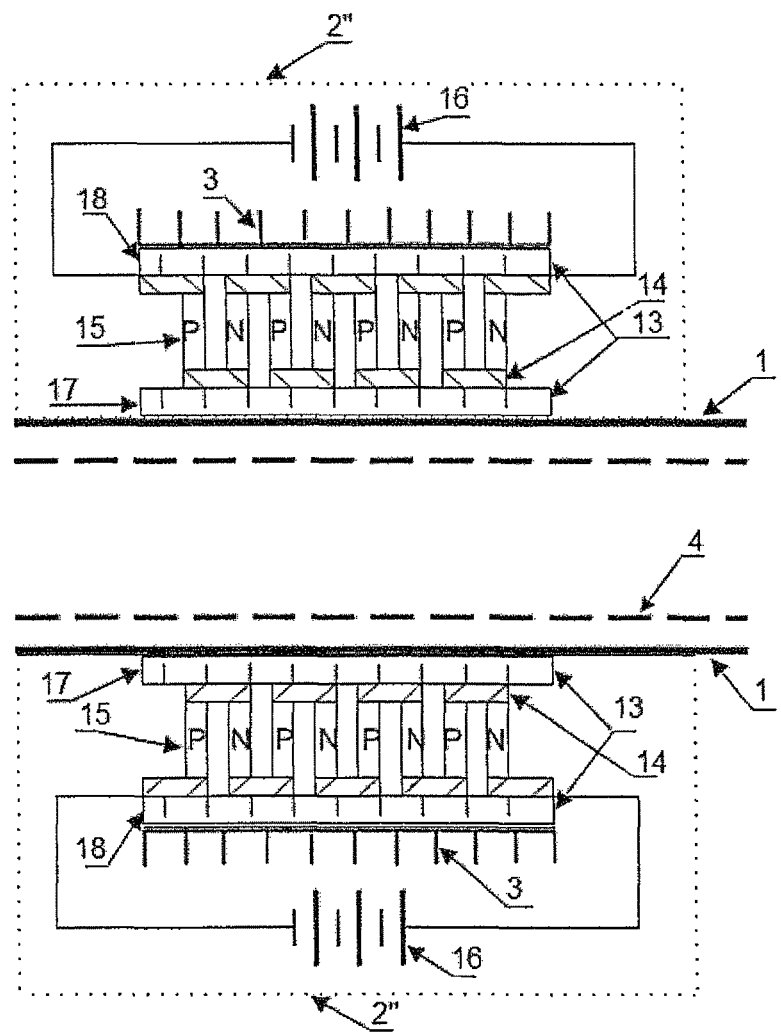
FIG. 8 schematically shows the muffler with the semiconductor refrigeration system as the refrigeration system according to an example of the present invention.

Referring to FIG. 8, the muffler with the low temperature refrigeration system based on the acoustic ray deflection theory according to the present example, is composed of the muffler housing 1, the low temperature refrigeration system 2", the temperature control device 3 and the sound-absorbing structure 4, wherein the external surface of the muffler housing 1 is equipped with the low temperature refrigeration system 2" using the semiconductor refrigeration system comprising the insulation potsherd 13>the metallic conductor 14>the N-type and P-type semiconductors 15 and the direct-current power supply 16, to form the cold end 17 and hot end 18 respectively; And the said temperature control device 3 may control the dissipation of the heat through the conventional radiating fin, the fan, the cooling air or the cooling water. As for the muffler according to the example, it's identical with that of the example 2, except for using the semiconductor refrigeration system of which the semiconductor cooling chip, the cold end, is applied to the external surface of the muffler pipeline, to realize the quantitative control of the temperature gradient through the low temperature refrigeration system 2 and temperature control device 3. And, the internal surface of the muffler housing 1 is laid with the sound-absorbing structure 4.

Example 4

Figure 9:
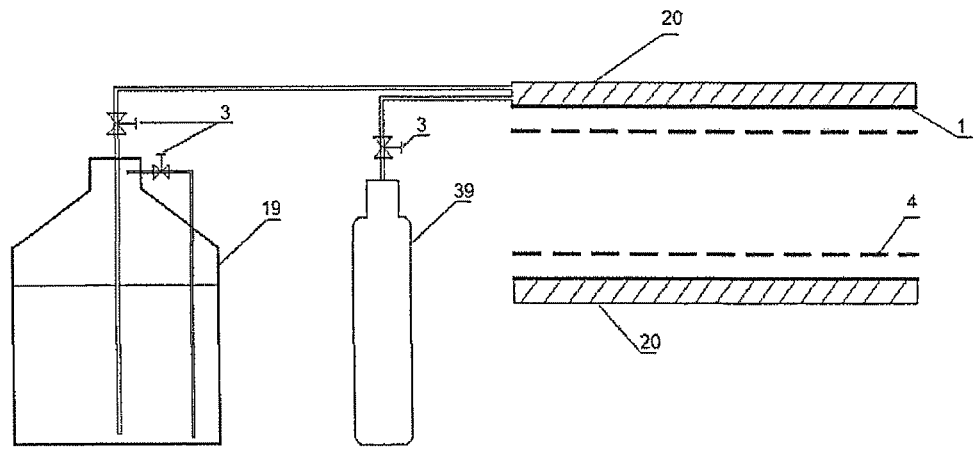
FIG. 9 schematically shows the muffler with the liquid nitrogen refrigeration as the refrigeration system according to an example of the present invention.

Referring to FIG. 9, the muffler with the low temperature refrigeration system based on sound ray deflection theory according to the present example, is composed of the muffler housing 1, the low temperature refrigeration system 2, the temperature control device 3 and the sound-absorbing structure 4, wherein the external surface of the muffler housing 1 is equipped with the low temperature refrigeration system 2 using the liquid nitrogen refrigeration system consisting of the liquid nitrogen Dewar's flask 19 and the pipeline chiller 20, and the temperature control device regulates the nitrogen pressures within the liquid nitrogen Dewar's flask 19 and the nitrogen cylinder 39 and the flow rates of the liquid nitrogen and the nitrogen in normal temperature fed to the pipeline chiller 20, through the valves, so as to realize a temperature quantitative control. And, the sound-absorbing structure 4 is laid on the internal surface of the muffler housing 1. As for the muffler according to the example, it's identical with that of the example 2, except for using the liquid nitrogen refrigeration system as the low temperature refrigeration system, in which the said liquid nitrogen and the nitrogen in normal temperature is fed to the pipeline chiller 20, and mixed therein, followed by cover the said pipeline chiller 20 on the external surface of the said muffler housing 1; and the temperature control device 3 regulates the temperature of the external surface of the muffler housing 1 by controlling the flow rates of the liquid nitrogen in Dewar's flask 19 and the nitrogen in normal temperature in the nitrogen cylinder 39, so as to realize controlling temperature of muffler housing 1.

Example 5

Figure 10:
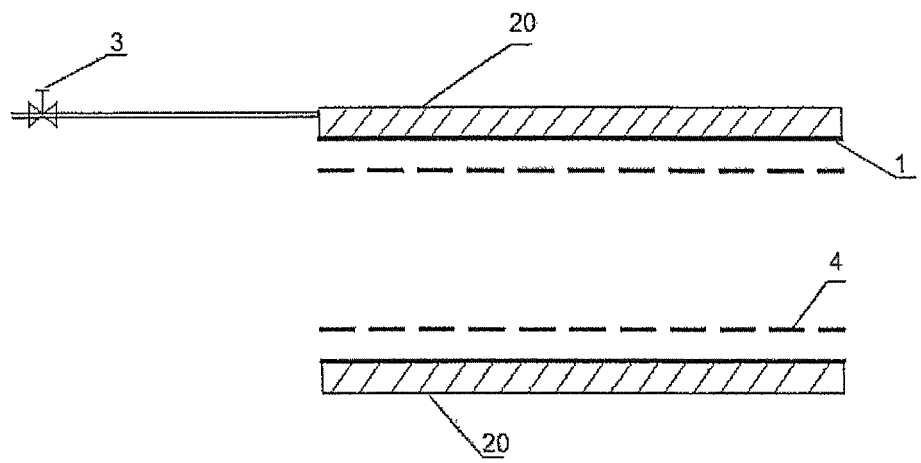
FIG. 10 schematically shows the muffler delivering the gas with the temperature lower than that inside the pipeline to the external surface of the muffler housing by the refrigeration system prior fixed in the surrounding environment.

Referring to FIG. 10, the muffler with the low temperature refrigeration system based on the acoustic ray deflection theory, is composed of the muffler housing 1, the low temperature refrigeration system 2, the temperature control device 3 and the sound-absorbing structure 4, wherein the external surface of the muffler horsing is equipped with the low temperature refrigeration system 2 using the prior low temperature refrigeration system of the surrounding environment for delivering the cooling gas or liquid with the temperature lower than that within the pipeline to the external surface of the muffler housing 1; the temperature control device regulates the flow rates of gas within the low-temperature pipe or cooling liquid fed to pipeline chiller 20 through the valves so as to realize the quantitative temperature control. The muffler of the present example is identical with that of the example 2 excepting for the above.

Example 6

Figure 11:
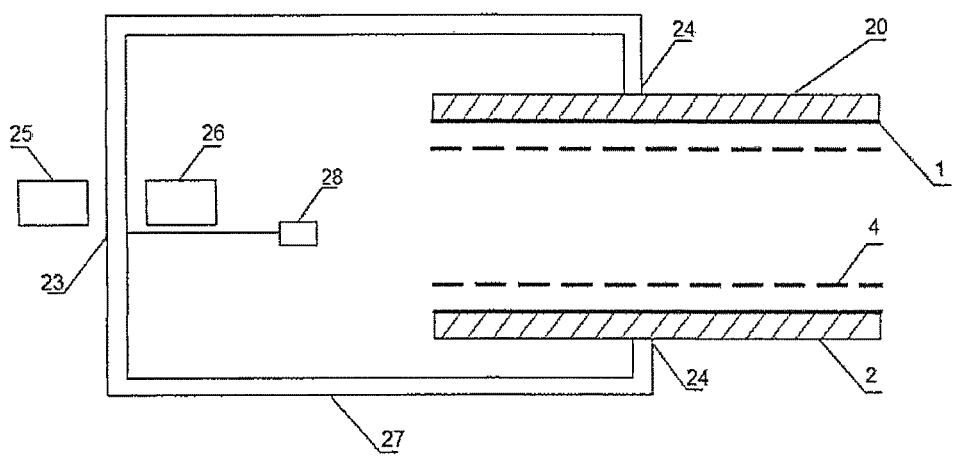
FIG. 11 schematically shows the muffler with the magnetism refrigeration system.

Referring to FIG. 11, the muffler with the low temperature refrigeration system based on sound ray deflection theory according to the present example, is composed of the muffler housing 1, the low temperature refrigeration system 2, the temperature control device 3 and the sound-absorbing structure 4, wherein the external surface of the muffler housing 1 is equipped with low temperature refrigeration system 2 using the magnetic refrigeration system consisting of the magnetic refrigerant 27, the N-magnetic pole 25, the S-magnetic pole 26, the radiator 28, and the pipeline chiller 20 and so on. The said magnetic refrigerant 27 is isothermally magnetized in the high-temperature area 23, releasing the heat which is dissipated by the radiator 28, and adiabatically demagnetized in the low-temperature area 24 installed with the heat exchanger, which absorbs heat to form the cold end and reduce the temperature of the external surface of the muffler through pipeline chiller 20. The muffler of the present example is identical with that of the example 2 excepting for the above.

Example 7

Figure 12:
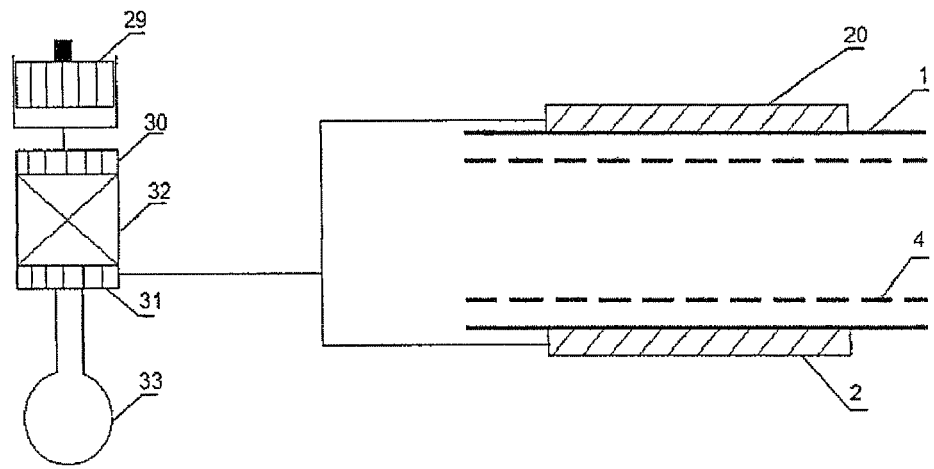
FIG. 12 schematically shows the muffler with the standing wave thermo acoustic refrigerator as the refrigeration system according to an example of the present invention.
Figure 13:
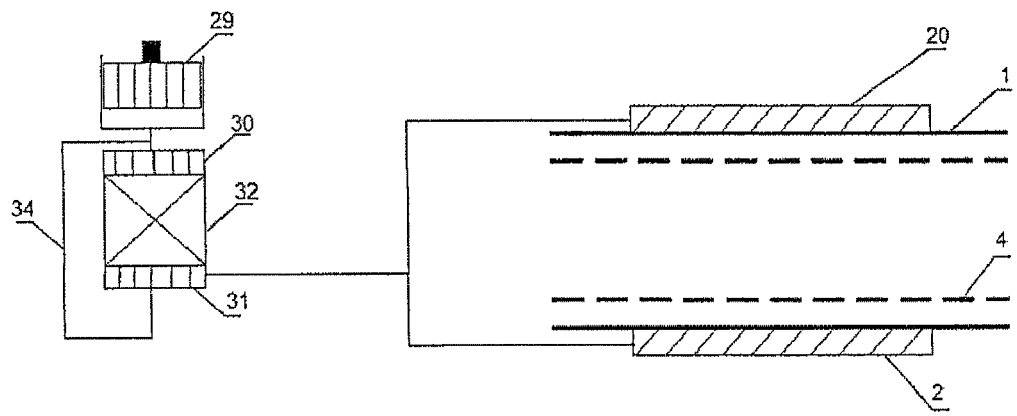
FIG. 13 schematically shows the muffler with the traveling wave thermo acoustic refrigerator as refrigeration system according to an example of the present invention.
Figure 14:
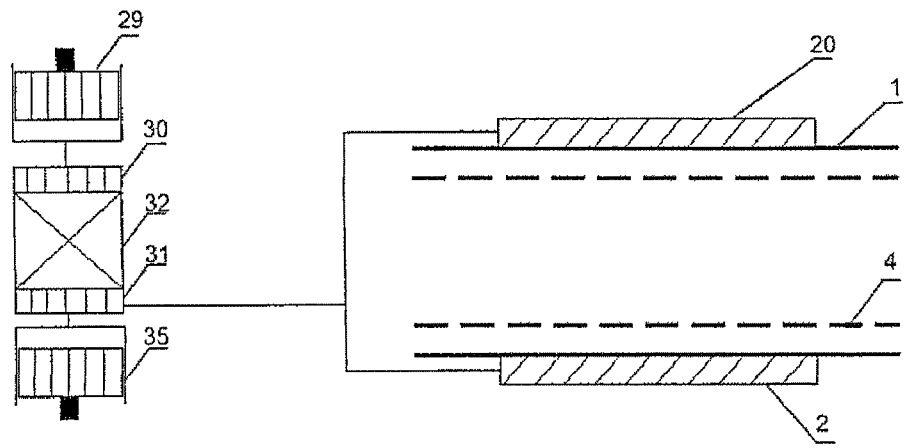
FIG. 14 schematically shows the muffler with the Stirling thermo acoustic refrigerator as the refrigeration system according to an example of the present invention.
Figure 15:
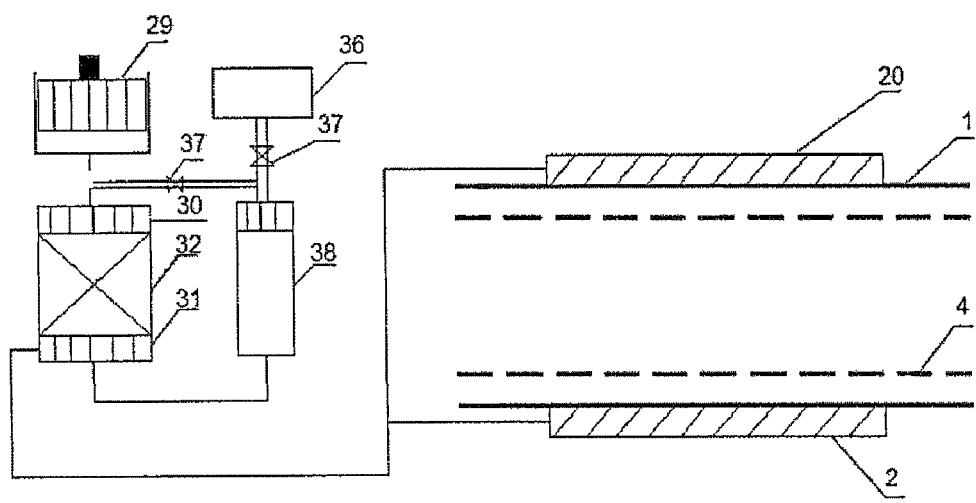
FIG. 15 schematically shows the muffler with the pulse tube thermo acoustic refrigerator as the refrigeration system according to an example of the present invention.

Referring to FIGS. 12, 13, 14 and 15, the muffler with the low temperature refrigeration system based on sound ray deflection theory according to the present example, is composed of the muffler housing 1, the low temperature refrigeration system 2, the temperature control device 3 and the sound-absorbing structure 4, wherein the external surface of the muffler housing 1 is equipped with the thermo acoustic refrigeration system as the low temperature refrigeration system 2 which is the standing wave thermo acoustic refrigerator, the traveling wave thermo acoustic refrigerator, the Stirling refrigerator and the pulse tube refrigerator respectively. As shown by FIG. 12, the standing wave thermo acoustic refrigerator is composed of the acoustic wave generator 29, the high-temperature heat exchanger 30, the low-temperature heat exchanger 31, the heat regenerator 32, the resonance cavity 33 and the pipeline chiller 20. As shown by FIG. 13, the traveling wave thermo acoustic refrigerator is composed of the acoustic generator 29, the high-temperature heat exchanger 30, the low-temperature heat exchanger 31, the heat regenerator 32, the traveling wave acoustic tube 34 and the pipeline chiller 20. As shown by FIG. 14, the Stirling refrigerator is composed of the acoustic wave generator 29, the acoustic wave absorber 35, the high-temperature heat exchanger 30, the low-temperature heat exchanger 31, the heat regenerator 32 and the pipeline chiller 20. And, as shown by FIG. 15, the pulse tube refrigerator is composed of the acoustic wave generator 29, the high-temperature heat exchanger 30, the low-temperature heat exchanger 31, the heat regenerator 32, the gas storage 36, the valves 37, the pulse tube 38 and the pipeline chiller 20.

According to principles of thermo acoustic, the heat is released in the high-temperature heat exchanger 30 releases heat, and is absorbed in the low-temperature heat exchanger 3 It, which forms a cold end and reduces the temperature of the external surface of the muffler through pipeline chiller 20. The muffler of the present example is identical with that of the example 2 excepting for the above.

Example 8

Figure 16:
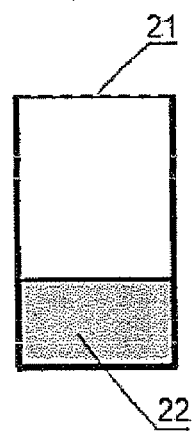
FIG. 16 schematically shows the freezing ice structure in the bottom of the muffler with the micro slit sound absorption structure.

Referring to FIG. 16, the micro slit sound-absorbing structure 21 is frozen, by disposing it in the freezer for more than 10 hours, so that the ice 22 is frozen and fixed in the bottom of the micro slit sound-absorbing structure 21 to obtain the micro slit sound-absorbing structure 21 in freezing.

The micro slit sound-absorbing structure 21 is provided with the structural parameters as the slit length in 1.8 mm, the slit width in 0.03 mm, the slit spacing in 5 mm, the panel thickness in 0.8 mm, the cavity depth in 298 mm, and the ice thickness in 42 mm. And, the micro slit sound-absorbing structure 21 with a frozen bottom is fixed in the test end of the standing wave tube.

Figure 17:
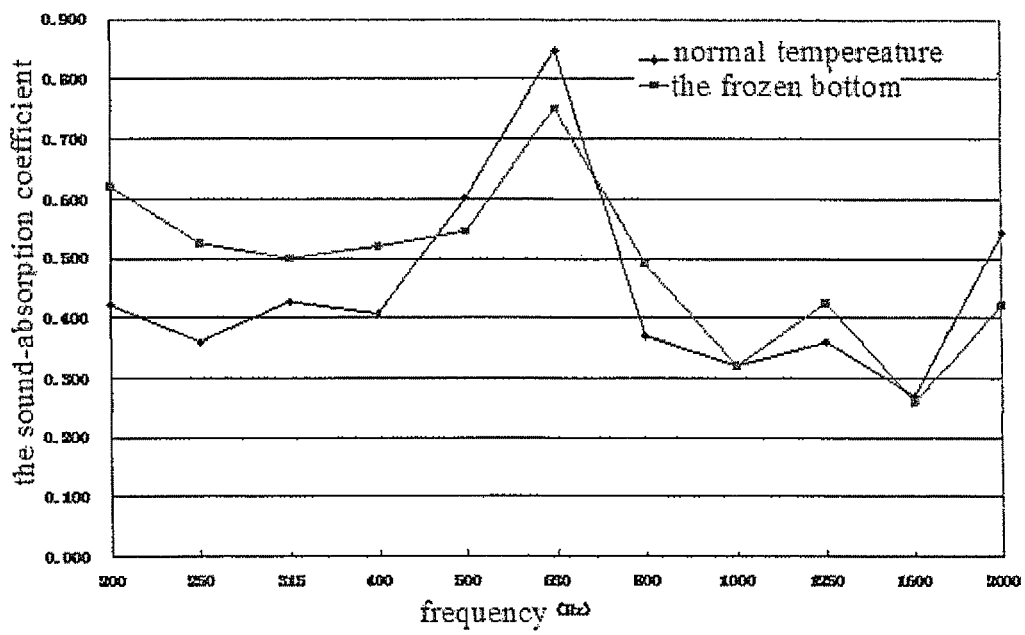
FIG. 17 shows the measurements of the sound-absorption performance for the standing wave tube in the condition of freezing in the bottom of the micro slit sound absorption structure.

The micro slit sound-absorbing structure 21 with a frozen bottom of the present example is carried out the acoustic absorption performance test in the normal incidence on the standing wave tube. The normal incidence sound-absorption coefficient for the frozen and unfrozen the micro slit sound-absorbing structure 21 is shown in FIG. 17. The sound-absorption coefficients for the frozen micro slit sound-absorbing structure 21 at 125 Hz, 160 Hz and 200 Hz respectively are increased from 0.410, 0.400, and 0.420 to 0.685, 0.720 and 0.620, is higher 0.1 to 0.3 than those for the unfrozen micro slit sound-absorbing structure within in low frequency band of 125 Hz~400 Hz, and is increased comparing with the unfrozen micro slit sound-absorbing structure within the frequency of 800 Hz to 1600 Hz.

The comparison of the sound-absorption coefficient for the micro slit sound-absorbing structure 21 with the frozen and unfrozen bottom indicates that for the micro slit sound-absorbing structure with the frozen bottom, the sound-absorption coefficient is significantly increased not only in the low frequency, but also in the intermediate frequency, resulting in the effective inhibition on the broadband noise and the increase of the sound-absorption capability in the overall band.

Example 9

Figure 18:
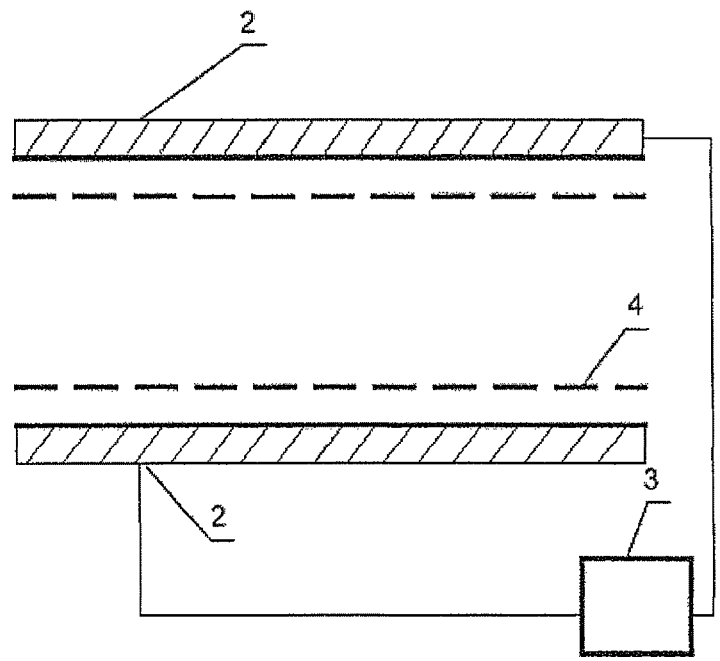
FIG. 18 schematically shows the muffler with the low temperature refrigeration system covering the 100% area.
Figure 19:
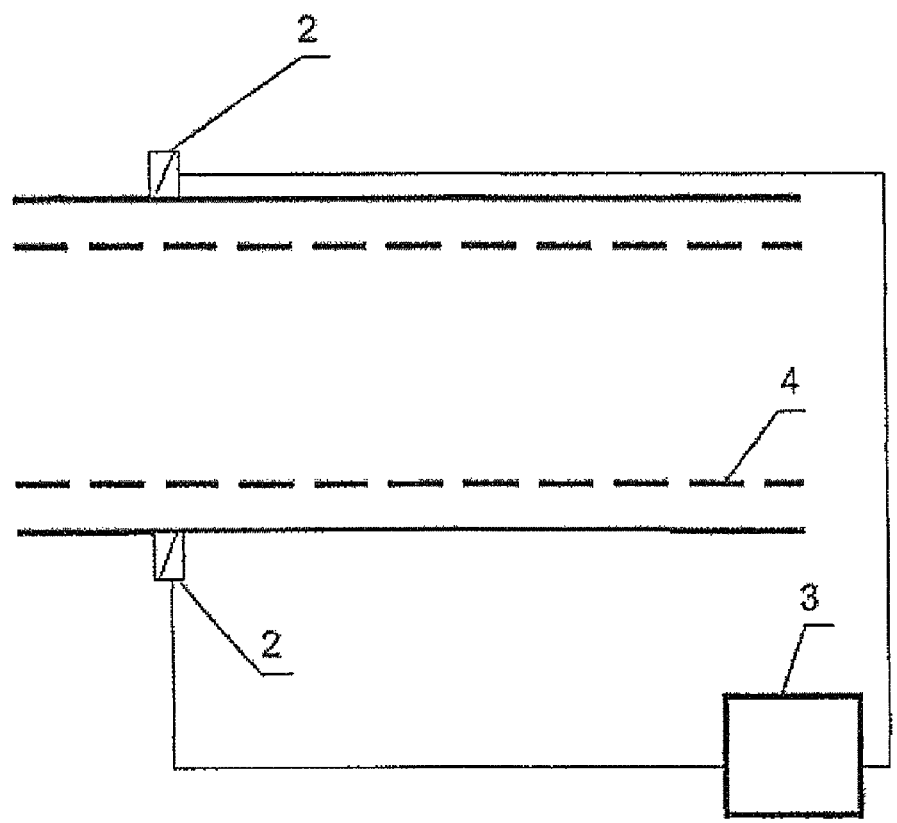
FIG. 19 schematically shows the muffler with the low temperature refrigeration system covering 5% of area.

Referring to FIGS. 18 and 19, the mufflers with the low temperature refrigeration system based on the acoustic ray deflection theory, are respectively installed with the low temperature refrigeration systems on the external surface of muffler housing 1, and at least covering 5% and 100% of the surface area of the muffler respectively. In practice, the covering area may range from 5% to 100% of the surface area of the muffler.

In summary, the present invention provides the muffler based on the acoustic ray deflection theory which captures and eliminates the noise at maximum by the bend and deflection of the acoustic ray resulting from the "cold trap" causing by the temperature gradient in substance, while full performing the sound-absorption potential of the sound-absorbing structure of the prior muffler, so that it is a noise reduction technology with low temperature refrigeration system based on the temperature gradient and the deflection of the acoustic ray deflection theory. It is characterized by applying the temperature gradient as a optimized design parameter to the design of the muffler design, and providing a cold end muffler with a low-temperature refrigeration system generating temperature gradient by installing the low-temperature refrigeration systems on the external surface of the muffler in the case that the acoustic attenuation capability of the prior muffler has been saturated. The temperature gradient makes the sound ray within the pipeline bend and deflect towards the cold end, the sound-absorbing structure on the internal surface of the pipeline, which reduces the portion of the acoustic wave flitting rather than contacting the sound-absorbing structure of the muffler within the muffler pipeline, allows more acoustic wave to transmit in to the sound-absorbing structure lined in the muffler in the oblique incidence, more effectively performs the sound-absorption potential of the sound-absorbing structure of the muffler, enhances the effective absorption of the noise within the pipeline, reduces the amplitude of the stimulated acoustics normal vibration pattern within the pipeline, increases the sound deadening capacity of the muffler, and reduce the noise radiated from the pipeline.

The higher the temperature inside the air pipe is, the greater the relative temperature gradient is, and the more acoustic ray will be bent and deflected, so that it is more helpful to fully perform the sound-absorption potential of the prior sound-absorbing structure. The muffler according to the present invention realizes the quantitative control of the temperature gradient through regulating the temperature of the cold end of the low temperature refrigeration system, further improves the sound deadening capacity of the muffler, and optimizes the absorption band, as well as providing the addition to sound deadening capacity for the prior muffler by installing the low-temperature refrigeration systems on the external surface, not changing the structure of the prior muffler, which is the improvement to the prior pipe muffler.

The test results of the examples 1 and 8 have proved the feasibility and the effectiveness of reducing the noise for the method of capturing and reducing the noise utilizing "cold trap", the technology of the low temperature cooling and noise-reduction based on temperature gradient and the bending and deflection of the sound ray. On the one hand, the additional sound deadening capacity caused by sound ray bending and deflecting resulting from the temperature gradient generated by the cold end indicates that the prior muffler still posses the potential acoustic attenuation capability which will be arisen from bending and deflecting the acoustic ray caused by the temperature gradient generated by the cold end.

On the other hand, even in the case of the normal incidence, the acoustic absorption capability of the sound-absorbing structure in the cold end is also improved to a certain extent. Therefore, the temperature of the cold end enables the part of the acoustic wave in the normal incidence not to "escape" by reflection, but re-enter the sound-absorbing structure for the treatment of the acoustic attenuation again, with the effect of the temperature gradient.

It is capable provide the temperature gradient in the cold end meeting the requirement of greatly reducing the noise and allowable to the environment by optimizing and changing the way of providing the cold end and installing for the low temperature refrigeration system which may be selected from the compressor refrigeration system, the semiconductor refrigeration system, the liquid nitrogen refrigeration system, the dry ice refrigeration system, the sound refrigeration system, the chemical refrigeration system, the magnetism refrigeration system, the adsorption refrigeration system, the vessel refrigeration system and the solar energy refrigeration system, and may realize the refrigeration by transporting the gas with the temperature lower than that within the pipeline or the cooling liquid through the prior refrigeration system in the surrounding environment, or even by providing a cold end by coating the ice layer on the external surface of the muffler housing 1, in order to meet the requirements of the noise control of the various occasions.

The muffler and method according to the present invention may be applied to the in taking or exhausting pipeline systems such as the nacelle muffler of the aircraft engine nacelle, the muffler duct of the helicopter turbo shaft engine, and the gas turbine etc. and other occasions with the environmental conditions convenient and allowable to provide the cold end low-temperature refrigeration system.

Further, should note that the above examples only for illustration of the technical solution of the present invention rather than any limit on the present invention. While the present invention is described in detail with the reference to above examples, those skilled in the art should understand that any alternative modification or replacement identical to the present invention be fallen into the scope claimed by the present invention, without departure from the spirit and scope of the present invention.

The invention claimed is:

1. An acoustic attenuation method based on the acoustic ray deflection theory, comprises of providing a temperature gradient, in which the temperature on the outer surface of the wall of the chamber is lower than that of the interior of the chamber, between the interior and the exterior of the chamber through a low temperature refrigeration system fixed on the external surface of the pipe wall of a muffler; and deflecting the acoustic ray inside the muffler pipeline toward the external surface with the lower temperature resulting from the said temperature gradient according to Fermat principle, in allowance of more acoustic rays transmitting into an absorption sound structure inner-lined to the muffler in the form of oblique incidence, resulting in the increase of the incidence angle of the acoustic wave in glancing incidence, the increase of the sound-absorption coefficient for the said absorption sound structure, more effectively absorbing the noise inside the muffler pipeline, the reduction the amplitude in the stimulated acoustics normal vibration pattern within the muffler pipeline, the increase of the acoustic attenuation capability of the muffler, and the decrease of the radiated noise.

2. The method according to the claim 1, is characterized in that, the said low temperature refrigeration system covers at least 5% of the area of the external surface of the muffler pipeline.

3. A muffler based on acoustic ray deflection theory, including a muffler housing laid with a sound absorption structure (4) on its internal surface, is characterized in that, the external surface of the said housing (1) is provided with a low temperature refrigeration system (2), covering at least 5% of the area of the external surface of the muffler housing (1), in the position corresponding to the sound absorption structure (4).

4. The muffler according to the claim 3, is characterized in that, the said low temperature refrigeration system (2) is connected with a temperature control installation (3) configured to realize a quantitative control of the temperature gradient.

5. The muffler according to the claim 4, is characterized in that, the said quantitative control of the temperature gradient ranges from 1° C. to 2000° C., higher than the temperature inside the pipeline of the muffler housing (1) compared with the temperature on the external surface of the muffler housing (1).

6. The muffler according to the claim 3, is characterized in that, the said sound absorption structure (4), may be selected from the porous sound-absorbing material, a sheet resonance sound-absorbing structure, a film resonance sound-absorbing structure, a perforated panel sound-absorbing structure, a micro-perforated panel sound-absorbing structure, the micro-slit sound-absorbing structure, a tube bundle perforated panel resonation sound-absorbing structure or a composite tube bundle perforated panel resonance sound-absorbing structure.

7. The muffler according to the claim 3, is characterized in that, the cross section of the said muffler housing (1) is circular, ellipse or rectangle.

8. The muffler according to the claim 3, is characterized in that, the thickness of the sound absorption structure (4) is 1~1000 mm.

9. The muffler according to the claim 3, is characterized in that, the said low temperature refrigeration system (2) may be selected from a compressor refrigeration system, a semiconductor refrigeration system, the liquid nitrogen refrigeration system, a dry ice refrigeration system, an acoustic refrigeration system, a chemical refrigeration system, a magnetism refrigeration system, an adsorption refrigeration system, a pulse tube refrigeration system or a solar energy refrigeration system, and may realize refrigeration by providing a cold end on the external surface of the muffler housing (1) by transporting the cooling gas or the cooling liquid with the temperature lower than that of the interior of the pipeline, or coating an ice layer on the external surface of the muffler housing (1).

10. The muffler according to the claim 9, is characterized in that, the said compressor refrigeration system includes a compressor (10) with a refrigeration system into a connection with the temperature control device (3) comprising of an expansion valve (6) and a capillary temperature bulb (7), a condenser (11), an evaporator (12) with the pipeline winding around the external surface of the muffler pipeline and a receiver-dryer (5).

11. The muffler according to the claim 9, is characterized in that, the said semiconductor refrigeration system includes an insulation potsherd (13), a metallic conductor (14), a N-type and P-type semiconductor (15) and direct-current power supply (16), which are connected into a cold end (17) and a hot end (18) respectively, wherein the cold end (17) attaches to the external surface of the muffler housing (1), the temperature control device (3) regulates the heat dispersion using a radiating fin, a fan, and the cooling air or the cooling water; and a semiconductor refrigeration chip is applied to the external surface of the muffler pipeline, so as to control the temperature of the external surface of the muffler housing (1) by means of regulating the heat dispersion of the hot end of the semiconductor refrigeration chip.

12. The muffler according to the claim 9, is characterized in that, the said liquid nitrogen refrigeration system includes a liquid nitrogen Dewar's flask (19), a normal temperature nitrogen cylinder (39) and a pipeline chiller (20), to which the liquid nitrogen and the nitrogen in the normal temperature are fed and mixed, covering the external surface of the muffler housing (1), and electronically connecting with a flow meter of the temperature control device (3), configured to control the temperature of the external surface of the muffler housing (1) by controlling the flow rates of the liquid nitrogen and the nitrogen in the normal temperature.

13. The muffler according to the claim 9, is characterized in that, the said magnetism refrigeration system includes magnetic refrigerant (27), a N-magnetic pole (25), S-magnetic pole (26), a radiator (28) and a pipeline chiller (20), wherein the said magnetic refrigerant (27) is isothermally magnetized in the high temperature area (23), emitting the heat which is dissipated through the radiator (28), and is adiabatically demagnetized in the low temperature area (24), absorbing the heat by the pipeline chiller (20) mounted in the low temperature area of the magnetic refrigerant (27), to form the cold end covering the external surface of the muffler housing (1).

14. The muffler according to the claim 9, is characterized in that, the said thermo acoustic refrigeration system is selected from a standing wave thermo acoustic refrigerator, a traveling wave thermo acoustic refrigerator, a Stirling refrigerator or the pulse tube refrigerator which emits the heat in the high temperature heat exchanger (30) according to the thermo acoustic principle, and absorbs the heat in the low temperature heat exchanger (31) in connection with the pipeline chiller (20) covering the external surface of the muffler housing (1), respectively, in order to form the cold end, wherein the said standing wave thermo acoustic refrigerator includes an acoustic wave generator (29), a high-temperature heat exchanger (30), a low temperature heat exchanger (31), a heat regenerator (32), a resonator cavity (33) and a pipeline chiller (20);

the said traveling wave thermo acoustic refrigerator includes an acoustic generator (29), a high-temperature heat exchanger (30), a low temperature heat exchanger (31), a heat regenerator (32), a traveling wave acoustic tube (34) and a pipeline chiller (20);

the said Stirling refrigerator includes an acoustic generator (29), an acoustic absorber (35), a high temperature heat exchanger (30), a low temperature heat exchanger (31), a heat regenerator (32) and a pipeline chiller (20); and the said pulse tube refrigerator includes an acoustic generator (29), a high temperature heat exchanger (30), a low temperature heat exchanger (31), a heat regenerator (32), a gas storage (36), a valve (37), a pulse tube (38) and a pipeline chiller (20).

15. The muffler according to the claim 9, is characterized in that, the said cooling gas or the cooling liquid with the temperature lower than that of the interior of the pipeline flow through the pipeline chiller (20) covering the external surface of the muffler housing to form the cold end.

16. The muffler according to the claim 9, is characterized in that, the ice or the dry ice is put into the pipeline chiller (20) covering the external surface of the muffler housing (1) to provide the said ice layer forming the cold end by virtue of the dry ice and its physical property.

* * * * *